Patented Aug. 9, 1949

2,478,200

UNITED STATES PATENT OFFICE 2,478,200

DEFLUORINATION OF PHOSPHATE ROCK

Ernest J. Maust and Clinton A. Hollingsworth, Lakeland, Fla., assignors to Coronet Phosphate Company, New York, N. Y., a corporation of New York No Drawing. Application April 26, 1946, Serial No. 665,346

4 Claims. (Cl. 71—44)

This invention relates to the defluorination of phosphate rock by calcination in the presence of water vapor, and has for its object the provision of certain improvements in that process.

Fluorine is present in practically all native phosphate rock, in amount varying in the different areas in which it occurs. The common Florida phosphate rock (e. g. pebble rock) usually contains from 3.5 to 4% of fluorine, around 75% bone phosphate of lime (B. P. L.), around 5% silica, around 5% calcium carbonate, around 2% iron and aluminum oxides, and the balance organic matter and other impurities. The fluorine is commonly believed to be present as calcium fluoride and also combined with the tricalcium phosphate as calcium fluorphosphate or fluorapatite ($Ca_{10}F_2(PO_4)_6$), and this combination is believed to be largely responsible for the low fertilizer efficiency of the raw rock (or concentrate), as evidenced by the customary ammonium citrate solubility test. Moreover, the high fluorine content of the raw rock makes it unsuitable as an animal feed or mineral supplement. Among the many proposals for defluorinating raw phosphate rock, the calcination process in the presence of silica and water vapor has heretofore appeared the most promising and a vast amount of work has been done in the endeavor to commercialize that process.

The presence of silica, usually in relatively large amount, has heretofore been considered essential in defluorinating phosphate rock by the action of water vapor. Various explanations of the action of silica in the defluorinating process have been advanced. Thus, it has been asserted that silica, sometimes in conjunction with calcium carbonate, sodium or potassium sulphate or other agents, was necessary in order to break the bond of the apatite lattice and free the fluorine. In some quarters, it was believed that the silica was necessary for combination with the free limestone or calcium carbonate, or with the compounds of iron and aluminum customarily present in most phosphate rocks. In other quarters, silica was believed necessary in order to combine with the fluorine. In U. S. Letters Patent of one of us (Maust) No. 2,446,978, patented August 10, 1948, it was recognized, contrary to the then general belief, that the action of the silica is mainly mechanical to keep the particles of rock separated and thereby prevent their fusion and consequent failure of intimate contact with water vapor, and the defluorinating process of that application accordingly involves the admixture with the phosphate rock of from 35 to 45% by weight of silica and calcining temperature of from 2700 to 3000° F.

As the result of an exhaustive investigation of the subject, we have found that the presence of silica in amount up to about 30% generally promotes fusion of the phosphate rock at temperatures too low for effective defluorination. In the aforementioned Maust patent, such a large amount of silica is mixed with the phosphate rock as to minimize contact of the rock particles with one another and consequently fusion and sticking together of the particles is thus avoided. In our copending application Ser. No. 665,344, filed April 26, 1946, we have pointed out that while silica promotes fusion as aforesaid, it does accelerate the elimination of fluorine at carefully controlled low temperatures such as 2600° F., but that the difficulties of closely controlling such calcining temperatures so as to avoid objectionable fusion of the charge are practically insurmountable in large scale operations. Hence, in accordance with the invention of that application, the calcining charge of phosphatic material contains such a small amount of silica, less than 4% and preferably less than 3%, that effective defluorination can be effected at temperatures in excess of 2600° F. without encountering fusion and without the necessity of carefully controlling the calcining temperature which may ultimately rise to approximately 3000° F.

Our present invention is based on our discovery that the defluorination of phosphate rocks of low silica content by calcination in the presence of water vapor is promoted and accelerated by the inclusion of aluminum phosphate ($AlPO_4$) in the calcining charge. Thus, the invention involves calcining at a temperature of at least 2500° F., and preferably between 2700 and 3000° F., and in the presence of water vapor, a charge composed predominantly of a finely divided phosphatic material and containing less than 4%, and preferably less than 3%, by weight of silica and from 2.5 to 7.5% and generally around 5% by weight of aluminum phosphate, and subjecting all parts of the charge to the action of water vapor during the entire period of calcination. Most phosphate rocks contain small amounts of aluminum, generally reported as $Al_2O_3$, although the aluminum is probably present in combination with silica, as an aluminum silicate, or with calcium oxide and ferric oxide in the form of a complex combination which may be expressed by the formula $CaO \cdot Al_2O_3 \cdot Fe_2O_3 \cdot SiO_2 \cdot P_2O_5$. The aluminum phosphate contemplated in the practice of the present invention excludes any aluminum phosphate that might possibly be naturally present in the phosphatic material, and is added to the phosphate rock in making up the calcining charge. It is essential that the water vapor penetrate to all parts of the charge during the entire period of defluorination. At the preferred calcining temperature of between 2700 and 3000° F., substantially complete defluorination is effected in from 2.5 to 10 minutes. Aluminum phosphate is stable at elevated temperatures, and its melting temperature is so high that it does not fuse at defluorinating temperatures up to 3000° F. It is our present belief that the aluminum phosphate acts in the nature of a catalyst in freeing the fluorine in the apatite lattice and thus promoting and accelerating its elimination.

Aluminum phosphate occurs as such in certain native clays. However, in their native state such clays customarily contain too much silica for direct use in the practice of the present invention. By appropriate methods of purification, a refined aluminum phosphate product can be produced from such clays, and this refined product may be satisfactorily used in the practice of the invention. A customary process for producing a refined aluminum phosphate is the Bayer process. Aluminum phosphate is readily prepared chemically by reacting aqueous solutions of sodium phosphate and aluminum sulphate. When such solutions, in substantially stoichiometric proportions, are mixed at room temperature, aluminum phosphate is precipitated. The precipitate is recovered by filtering, washing and drying. The solution of aluminum sulphate may be made by reacting bauxite (a hydrated aluminum oxide ore) or kaolin (a hydrous silicate of aluminum) with sulphuric acid to form an aluminum sulphate solution. The solution of sodium phosphate may be made by reacting phosphoric acid with sodium hydroxide (caustic soda). The aluminum phosphate need not be of high purity. The slurry resulting from mixing and reacting the solutions of sodium phosphate and aluminum sulphate may be added directly to the finely divided phosphate rock, especially where the rock is moistened or wetted for nodulizing as hereinafter described. When a form of aluminum phosphate containing a considerable quantity of diluent or contaminant is used, such an amount should be mixed with the phosphatic material as to provide from 1 to 10% by weight, based on the weight of the calcining charge, of aluminum phosphate itself. While larger amounts of aluminum phosphate are not deleterious, economic considerations make it advisable to use only so much as is required to effect the optimum improvement in defluorination. With most phosphate rocks, we have found that about 5% aluminum phosphate gives entirely satisfactory results.

Most phosphate rocks, as mined, contain too high a silica content for direct treatment in accordance with the present invention. Silica may be removed to the necessary extent in any appropriate manner, as, for example, by flotation, electrostatic separation, sorting, or other silica-separating process. In most cases, the phosphate rock must be crushed and ground to a proper fineness to liberate mechanically bound free silica, a fineness of minus 48 mesh (standard Tyler screen) being generally adequate, although with some rocks a fineness of minus 200 mesh is necessary. Since for defluorination it is desirable that the rock be ground so that at least 65% passes through a 200 mesh screen and all passes through a 65 mesh screen, it is advantageous where possible to grind the rock to such a fineness in preparation for the removal of silica. By "free silica" is meant that present as "pimples" in the phosphate rock and plainly seen by means of either the naked eye or a microscope. The "combined silica" is that present in combination with other elements, and which cannot be removed by the ordinary silica-separating processes. It seldom is present in excess of 2%, and often is under 1%.

In the phosphate industry, silica is customarily determined as "insoluble matter" in one part of concentrated hydrochloric acid and one part of water at boiling temperature. The insoluble matter will consist for the most part of silica but may, and usually will, contain a relatively small amount of other insoluble substances. So far as the practice of the present invention is concerned, these other insoluble substances are unobjectionable and probably act in much the same manner as silica. Since in commercial practice, determinations of insoluble matter are more usual and more readily made than determinations of silica, it is generally more convenient, in practicing the invention, to consider the insoluble matter as the equivalent of silica, and throughout this specification and the appended claims the contemplated low percentages of silica in the calcining charge are to be considered as in the form of insoluble matter.

In carrying out the invention, the phosphate rock should be in a finely divided state, preferably so that at least 65% passes through a 200 mesh standard Tyler screen and all passes through a 65 mesh screen. While the phosphate rock of low silica content may be calcined in its finely divided form, superior results are generally attained by forming the finely divided rock into nodules, pellets, briquets or the like. Nodulizing or the like may be carried out as a preliminary or preparatory operation or may be effected in situ immediately preceding calcination. For example, suitable nodules, generally round in shape and varying in diameter from $\frac{1}{16}$th to 1 inch, may be made by moistening the finely divided rock with water or other suitable liquid and tumbling at room temperature in a rotating cylinder, barrel or the like. From 12 to 18% by weight of water or the like, and generally around 15%, will sufficiently moisten the dry finely divided rock for producing satisfactory nodules by tumbling. Nodules may also be made by drying an aqueous slurry of the rock, and cutting the dried product into suitably sized cubes or other shapes. Nodules may also be made mechanically by briquetting or the like, although nodules so produced are generally too dense or compact for effective subsequent penetration of the water vapor. When calcination is carried out in a rotary kiln, nodulizing may conveniently be effected in situ by making a slurry of the finely divided phosphate rock with from 40 to 50% by weight of water, and heating the slurry and evaporating the water in the low temperature end of the rotating kiln.

Calcination can be carried out in any suitable apparatus, such as a rotary kiln, electric furnace, shaft furnace, sintering machine etc. The multiple hearth shaft furnace disclosed in the copending patent application of one of us (Maust) Ser. No. 679,178, filed June 25, 1946., is a particularly suitable apparatus for the practice of the invention. In whatever apparatus employed, intimate and continuous association of the water vapor with the entire body or charge of phosphatic material undergoing calcination is necessary. As rapidly as water vapor is consumed in the operation, fresh water vapor must be available to instantly replace that consumed, and free evolution of the resulting gaseous products (e. g. fluorine or hydrogen fluoride, carbon dioxide, sulphur oxides etc.) is necessary. Heating in the presence of water vapor is thus continued until the desired elimination of fluorine is attained. In general, the higher the temperature of calcination the shorter is the required detention period at that temperature to effect the contemplated defluorination.

The invention, in its broad aspect, is illustrated in the following example in which the phosphate rock was a Florida pebble phosphate which had been subjected to flotation to remove silica. The analysis of the resulting low-silica rock was as follows:

| | Percent |
|---|---|
| Total P₂O₅ | 35.53 |
| Insoluble (SiO₂) | 2.68 |
| Fe₂O₃ and Al₂O₃ | 2.11 |
| Fluorine | 3.84 |
| Fineness | 74% minus 200 mesh |

The finely ground phosphate rock was mixed dry with 5% by weight of aluminum phosphate, and 0.5% by weight of bentonite was included in the mixture in order to give the nodules residual strength after drying as well as during calcination. The dry mixture was nodulized in a rotating cylindrical nodulizer by means of a spray of water, and the resulting generally round nodules were screened so as to give a calcining charge of uniformly sized nodules of minus ⅝ inch and plus ¼ inch in diameter. The dry nodules were calcined in an electrically heated furnace through which water vapor under a slight pressure was continuously passed. The slight water vapor pressure was needed to assure direct penetration of the nodules with water vapor. About 20 minutes was taken in gradually bringing the nodules up to a calcining temperature of 2800° F., at which temperature they were held for the various indicated time periods. The residual fluorine content (determined by analysis) of the calcined nodules indicates the effectiveness of the aluminum phosphate in promoting defluorination.

| Aluminum Phosphate | Percent Fluorine after being calcined at 2800° F. for— | | |
|---|---|---|---|
| | 2.5 min. | 5.0 min. | 10.0 min. |
| None | .72 | .68 | .55 |
| 5% | .06 | .03 | .01 |

In the foregoing example in which 5% aluminum phosphate was included in the calcining charge, the complete analysis of the calcined nodules was as follows:

| | Per cent |
|---|---|
| Total P₂O₅ | 38.93 |
| Insoluble matter | 1.39 |
| Combined Fe₂O₃+Al₂O₃ | 5.96 |
| Fluorine | .02 |
| P₂O₅ soluble in .4% HCl | 36.42 |
| P₂O₅ soluble in neutral ammonium citrate, A. O. A. C. official method | 37.91 |
| P₂O₅ soluble in 2% citric acid | 38.28 |

It will be noted that substantially all of the fluorine was eliminated, so that the calcined and defluorinated product can be safely used as a mineral supplement, and the apatite lattice is so completely broken by the removal of fluorine that substantially all of the phosphate is available as a fertilizer for plant growth. In addition, the total phosphate content (determined as P₂O₅) of the calcined and defluorinated product is higher than in the original raw rock due to the phosphate in the added aluminum phosphate, and to the volatilization of carbon dioxide, fluorine and silica. The decreased silica (insoluble) content (1.39%) of the calcined product, as contrasted with the silica content (2.68%) of the raw rock, should be especially noted. This loss of or reduction in silica is a characteristic feature of the invention, and is, we believe, due to the volatilization of silica, probably as silicon tetra-fluoride (SiF₄), induced by the presence of the aluminum phosphate. This reduction in silica increases the total phosphate (i. e. P₂O₅) content of the calcined product, and further diminishes any possible tendency of the charge to fuse during calcination because of its lower silica content. In the hereinbefore mentioned methods of defluorinating phosphate rock in the presence of relatively large amounts of silica and water vapor, we have found, as hereinbefore stated, that silica is not volatilized and that substantially all of the fluorine is removed as hydrogen fluoride (HF). These facts further confirm our present belief that the aluminum phosphate acts as a catalyst in freeing the fluorine and additionally in inducing the combination of silicon with fluorine.

The following additional examples illustrate the advantages of the invention in the case of other phosphate rocks of low silica content. The Virginia apatite, mined as a by-product in the preparation of titanium minerals, contained 40.50% total P₂O₅, 2.50% insoluble (SiO₂), and 2.52% fluorine. The Russian apatite, mined on the Kola peninsula in Russia, contained 39.24% total P₂O₅, 2.18% insoluble (SiO₂), and 3.03% fluorine. The mixture of the finely divided phosphate rock, 5% of aluminum phosphate and 0.5% bentonite was nodulized, and calcined in the presence of water vapor at 2800° F. for 10 minutes in each example:

*Virginia apatite*

| Aluminum Phosphate | Percent fluorine in calcined product |
|---|---|
| none | .61 |
| 5% | .01 |

*Russian apatite*

| Aluminum phosphate | Percent fluorine in calcined product |
|---|---|
| none | .98 |
| 5% | .06 |

While the aluminum phosphate invariably improves the ease of defluorination, we have found that the addition of small amounts of iron oxide (Fe₂O₃) and calcium carbonate (CaCO₃), say in amount of from 1 to 2% of each, is beneficial, especially when the phosphatic material being treated is deficient in these constituents, as compared with Florida phosphate pebble rock which customarily contains small and adequate amounts thereof for this purpose.

The superior and unexpected results obtained with aluminum phosphate as contrasted with alumina are shown by comparing the foregoing examples with similar calcining operations in which the aluminum phosphate was replaced by alumina:

*Florida pebble phosphate*

| Aluminum Compound | Percent fluorine after being calcined at 2800° F. for— | | |
|---|---|---|---|
| | 2.5 min. | 5.0 min. | 10.0 min. |
| AlPO₄ | .06 | .03 | .01 |
| Al₂O₃ | .44 | .29 | .17 |

*Virginia apatite*

| Aluminum Compound | Percent fluorine after being calcined at 2800° F. for 10 min. |
|---|---|
| AlPO₄ | .01 |
| Al₂O₃ | .37 |

*Russian apatite*

| Aluminum Compound | Percent fluorine after being calcined at 2800° F. for 10 min. |
|---|---|
| AlPO₄ | .06 |
| Al₂O₃ | .64 |

When the calcining charge is nodulized, the nodules should have a high degree of porosity in order that the water vapor may effectively penetrate throughout the entire mass of each individual nodule during calcination and defluorination. A desired degree of porosity may be obtained by including in the calcining charge some substance that volatilizes upon the application of heat, such as ammonium carbonate, or sulphur which burns off as sulphur dioxide, or one of a large variety of high fusion sulphates, carbonates, fluorides etc. which lose water of hydration upon heating. Porosity may also be obtained by mechanical means such as the addition of a frothing agent (e. g. soya bean extract, egg albumen etc.) to an aqueous slurry of the charge mixture, and then vigorously agitating the slurry, whereupon the slurry dries with a fluffy or porous structure.

We prefer, however, to impart porosity to the nodules by the invention of our copending patent application Ser. No. 665,348, filed April 26, 1946. In accordance with that invention, a highly effective porosity is imparted to the nodules by including from 5 to 50% by weight of carbonaceous material in the nodules and eliminating substantially all of the carbon of the carbonaceous material by reaction with water vapor at a temperature in excess of 1800° F. with evolution of the resulting gaseous products. At that temperature, the water vapor reacts with the hot carbon of the carbonaceous material with the evolution of hydrogen and carbon monoxide, in much the same way that water gas is formed. The heat treatment in the presence of water vapor is continued until the nodules are decarbonized for all practical purposes, that is until substantially all of the carbon has been eliminated, leaving the nodules with the desired degree of porosity. The decarbonizing temperature may advantageously be from 2000 to 2400° F. Too high a temperature should be avoided, since it may cause a loss of phosphorus through reduction of the phosphatic material by carbon, or may cause such substantial fusion or sintering of the nodules as to impede effective penetration of the water vapor throughout the mass of each individual nodule, with the result that all of the carbon is not eliminated. On the other hand, a slight amount of sintering is advantageous since it imparts a desired amount of strength to the decarbonized porous nodules. Thus, in the case of most finely divided phosphate rocks, incipient sintering takes place at about the same temperatures at which the water vapor reacts with the carbonaceous material, and this slight incipient sintering is sufficient to convert the nodules into relatively hard clinkers. Hence, when porosity is attained by the removal of carbon, the clinkered nodules are sufficiently strong to withstand subsequent handling in the calcining kiln or furnace without disintegration. Since we have observed that decarbonized nodules which have been cooled appear to fuse at a lower temperature than if not cooled, we prefer to directly subject the decarbonized nodules, without intermediate cooling and without substantial loss of heat, to defluorination.

A wide variety of carbonaceous materials are available for imparting porosity to the nodulized charge. Among these may be mentioned, by way of example, bituminous or anthracite coal, coke, charcoal, lamp black and other forms of carbon, liquid and solid petroleum products, waste sulphite liquor, flour, distillery slops, sawdust, ground up grape fruit peelings, etc. Solid carbonaceous materials are crushed (when necessary) and finely ground, preferably so that at least 75% passes through a 200 mesh standard Tyler screen, and substantially all passes through a 65 mesh screen. At least 5% by weight of carbonaceous material is required to impart any effective degree of porosity to the nodules, and generally at least 10% is preferred. The higher the percentage of carbonaceous material initially included in the nodules, the higher will be the porosity of the decarbonized nodules. In practicing the present invention with phosphate rock charges containing less than 4% of silica, the nodules may initially contain up to 50% by weight of carbonaceous material, from 10 to 40% by weight usually giving satisfactory results.

The defluorinated product must be cooled rapidly to prevent the tricalcium phosphate in the product reverting from its alpha form back to its original insoluble beta form. The alpha form is available as a fertilizer whereas the beta form is not. The cooled defluorinated product, in the form of individual clinkered nodules where the calcining charge was nodulized, is finely ground and is then ready for marketing and use as a mineral supplement in animal feeds or as a fertilizer of high available phosphate ($P_2O_5$) content.

The fluorine compounds (i. e. hydrogen fluoride (HF) and silicon tetra-fluoride ($SiF_4$)) in the gaseous product of the calcining operation may be scrubbed with water for recovery of the fluorine in the form of hydrofluoric acid, or may be reacted with a suitable substance, such as calcium carbonate, sodium carbonate, sodium hydroxide, aluminum oxide etc., for recovery in the form of fluorides, or may be otherwise appropriately recovered.

As hereinbefore mentioned, we prefer, when nodulizing the calcining charge, to include from 0.5 to 2.0% by weight of bentonite in the charge mixture in order to impart a desirable degree of hardness and strength to the dried nodules to withstand subsequent handling, and to prevent objectionable dusting of the nodulized charge during calcination, especially in a rotary kiln. Some phosphate rocks, such for example as Florida pebble rock and especially the phosphate rocks from North Africa, have when finely ground sufficient natural colloidal constituents to form strong nodules upon drying, and hence require but a small addition (e. g. 0.5%) of bentonite. On the other hand, phosphate rocks of the apatite type have little or no natural colloidal constituents, and as much as 2% by weight of bentonite may advantageously be included in the calcining charge to impart the desired degree of strength to the dried nodules.

We claim:
1. The method of defluorinating a phosphatic material containing less than 4% of silica in the form of insoluble matter which comprises adding to and mixing with the phosphatic material about 5% by weight of aluminum phosphate, calcining the resulting mixture at a temperature of at least 2500° F. but not so high that substantial fusion take place, and subjecting all parts of the mixture to the action of water vapor during the period of calcination.

2. The method of defluorinating a phosphatic material containing less than 3% of silica in the form of insoluble matter which comprises adding to and mixing with the phosphatic material about 5% by weight of aluminum phosphate, calcining the resulting mixture without substantial fusion at a temperature between about 2600° F. and about 3000° F., and subjecting all parts of the mixture to the action of water vapor during the period of calcination.

3. The method of defluorinating a phosphatic material containing less than 4% of silica in the form of insoluble matter which comprises adding to and mixing with the phosphatic material about 5% by weight of aluminum phosphate and at least 5% of carbonaceous material based on the weight of the phosphatic material, nodulizing the resulting mixture and subjecting the resulting nodules to the action of water vapor at a temperature in excess of 1800° F. until substantially all of the carbon of the carbonaceous material is eliminated by reaction with the water vapor and evolution of the resulting gaseous products, calcining the resulting porous nodules at a temperature of at least 2500° F. but not so high that substantial fusion takes place, and subjecting the porous nodules to the action of water vapor during the period of calcination.

4. The method of defluorinating a phosphatic material containing less than 3% of silica in the form of insoluble matter which comprises adding to and mixing with the phosphatic material about 5% by weight of aluminum phosphate and from 10 to 50% of carbonaceous material based on the weight of the phosphatic material, nodulizing the resulting mixture and subjecting the resulting nodules to the action of water vapor at a temperature between about 2000° F. and about 2400° F. until substantially all of the carbon of the carbonaceous material is eliminated by reaction with the water vapor and evolution of the resulting gaseous products, calcining the resulting porous nodules without substantial fusion at a temperature between about 2700° F. and about 3000° F., and subjecting the porous nodules to the action of water vapor during the period of calcination.

ERNEST J. MAUST.
CLINTON A. HOLLINGSWORTH.

REFERENCES CITED

The following references are of record in the file of this patent:

UNITED STATES PATENTS

| Number | Name | Date |
|---|---|---|
| 1,076,200 | Dunham | Oct. 21, 1913 |
| 1,396,149 | Soper | Nov. 8, 1921 |
| 1,854,765 | Rothe et al. | Apr. 19, 1932 |
| 1,902,832 | Caldwell | Mar. 28, 1933 |
| 2,093,176 | Tromel | Sept. 14, 1937 |
| 2,189,248 | Luscher | Feb. 6, 1940 |
| 2,279,033 | Dolbear | Apr. 7, 1942 |
| 2,283,174 | Bates | May 19, 1942 |

FOREIGN PATENTS

| Number | Country | Date |
|---|---|---|
| 6,632 | Great Britain | May 5, 1887 |
| 19,044 | Great Britain | 1911 |

OTHER REFERENCES

Waggaman, Phosphoric Acid, Phosphates, and Phosphatic Fertilizers, Chem. Cat. Co., N. Y., 1927, pp. 38–9, 47, 169.

Marshall et al., Ind. and Eng. Chem., vol. 27, No. 2 (1935), p. 206.